N. P. BURGESS.
INVALID-CHAIR.

No. 173,893. Patented Feb. 22, 1876.

4 Sheets—Sheet 1.

Witnesses:
Frank H. Jordan.
G. P. Broad

Inventor:—
Noah P. Burgess
per Wm. Henry Clifford
atty.

N. P. BURGESS.
INVALID-CHAIR.
No. 173,893. Patented Feb. 22, 1876.
4 Sheets—Sheet 2.
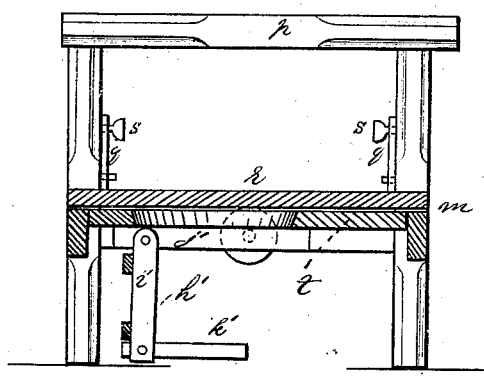
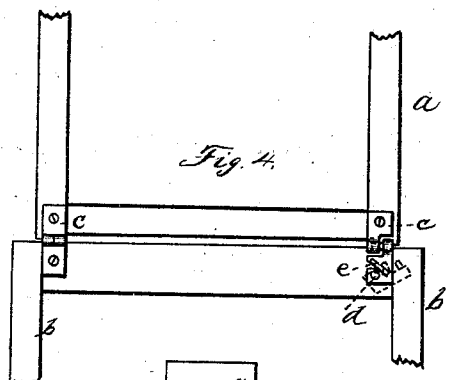
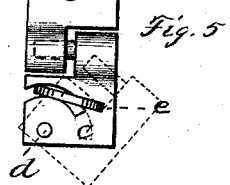
Witnesses:
Frank H. Jordan
Inventor:
Noah P. Burgess
per
Wm. Henry Clifford
atty.

N. P. BURGESS.
INVALID-CHAIR.

No. 173,893. Patented Feb. 22, 1876.

4 Sheets—Sheet 3.

Witnesses:
Frank H. Jordan

Inventor:
Noah P. Burgess
per
Wm. Henry Clifford
atty.

N. P. BURGESS.
INVALID-CHAIR.
No. 173,893. Patented Feb. 22, 1876.
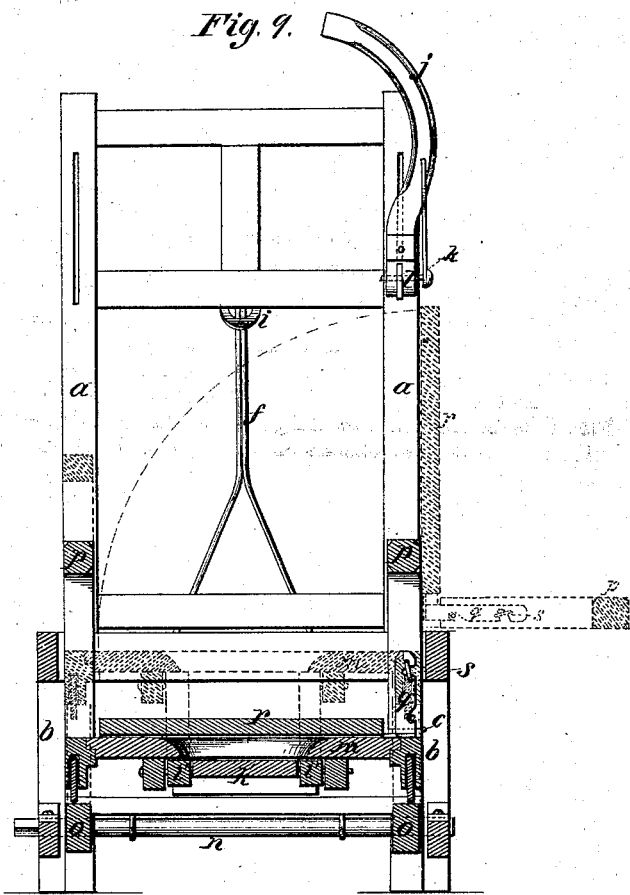
Witnesses. Inventor.
Frank H Jordan Noah P. Burgess
per Wm. Henry Clifford
atty

UNITED STATES PATENT OFFICE.

NOAH P. BURGESS, OF PORTLAND, MAINE.

IMPROVEMENT IN INVALID-CHAIRS.

Specification forming part of Letters Patent No. 173,893, dated February 22, 1876; application filed November 2, 1875.

*To all whom it may concern:*

Be it known that I, NOAH P. BURGESS, of Portland, in the county of Cumberland and State of Maine, have invented certain new and useful Improvements in Chairs; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
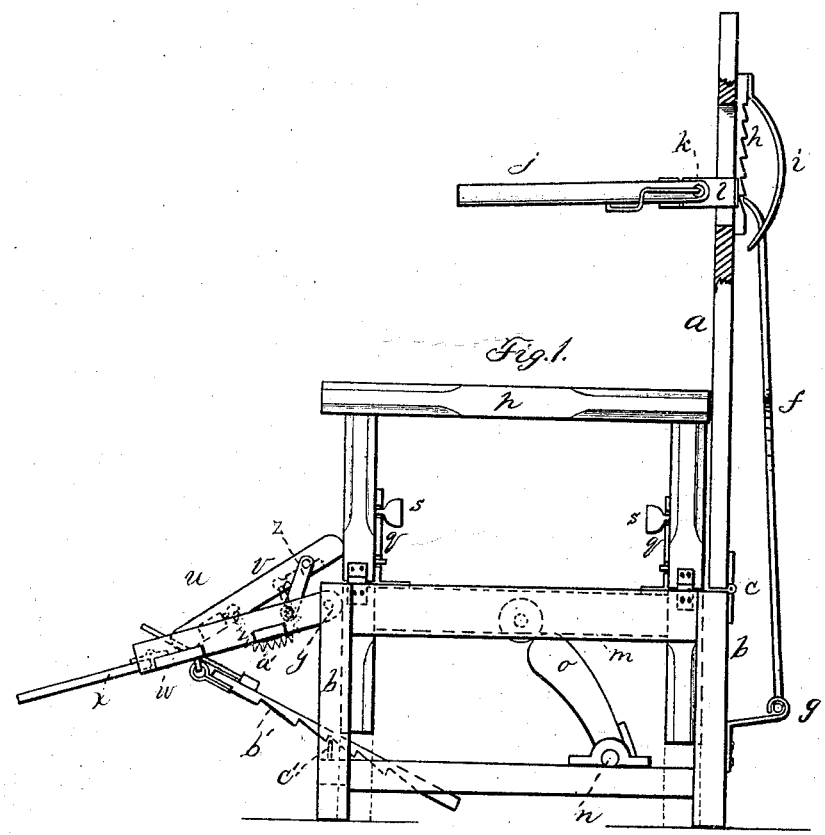
Figure 6:
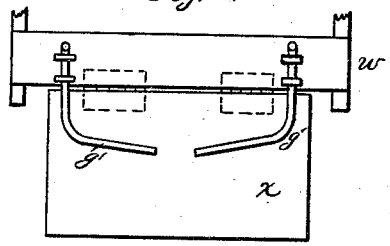
Figure 7:
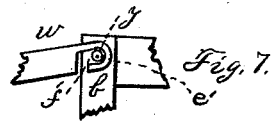
Figure 8:
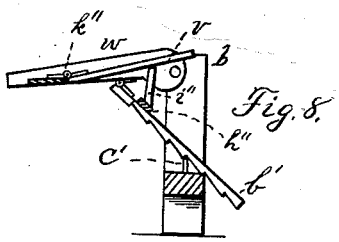

Figure 1 is a side view. Fig. 2 is a sectional view of the removable chair-seat and frame thereto. Fig. 3 is a view of the lever for operating the cams $o$. Fig. 4 is a detail back view. Fig. 5 is a view of the hinge $c$. Fig. 6 is a bottom view of the extension of the foot-rest, showing the supports $g'$. Fig. 7 is a detail view, showing the stud $e'$ and slot $f'$. Fig. 8 is a view of the modification of the foot-rest. Fig. 9 is a transverse vertical section view of the chair, showing, in full lines, the position of the bottom, false bottom, stool, arms, &c., as in ordinary use, and in dotted lines the position of the same parts when they are elevated by the cams, and the false bottom and arms thrown over, to use the chair as a stool-chair.

Same letters show like parts.

The purpose of my invention is to provide an easy or invalid chair.

The invention may be best understood by a description of the various parts.

$a$ shows the back, which is both removable and capable of different inclinations. $b$ is the frame of the body or bottom of the chair. The back is removable from this for convenience in packing and moving the chair. The hinges are shown at $c$. One of these has its lower half pivoted at $d$, so as to turn to one side. The thumb-screw $e$ holds this part in position to keep the back $a$ hinged to the frame $b$.

In order to remove the back $a$, loosen the thumb-screw $e$, turn to one side the pivoted half of one of the hinges $c$, and remove the back by slipping it to one side. Inclination is imparted to the back $a$ by means of the branching support $f$, working in sockets at $g$, and catching in the rack $h$, into the teeth of which the upper end of the support $f$ is pressed by the spring-arm $i$. The back $a$ carries, also, the head rest $j$, which is pivoted by a pivot, $k$, to a holder, $l$, sliding in a slot at the side of the back $a$. The head-rest is held in a horizontal position by the forward edge of the holder $l$, which fits into a slot in the back end of the head rest, is there secured by the pivot $k$, and does not allow of the dropping of the rest below a horizontal position. The rest consists of a curved arm, the outer end of which extends toward the center of the back, and is intended to receive the head of a person sitting in the chair, and inclining against the rest. The head-rest can be applied to either side of the back.

The seat is shown at $m$, and is raised, when desired, by a shaft, $n$, carrying cams $o$, working against the bottom edge of the chair-seat frame. Rollers may be provided to diminish the friction in the working of the cams. $p$ show the arms of the seat. Either or both may be hinged so as to turn downward and to one side. $q$ show slotted braces, fastened to the false bottom $r$ of the seat, and which may be connected with the supports of the arms on one side, so that when the arm is turned down it will elevate the false bottom $r$ when the chair is to be used for an invalid-stool. This connection of the false bottom with the arms of the chair-seat is effected by the braces $q$ and thumb-screws $s$. When the chair-seat is not elevated by the cams $o$, the upholstering of the seat will be level with the top of the seat or body frame $b$. When the seat is raised it facilitates the removal therefrom of a helpless patient. When so raised the person can be removed from one side by first turning down the chair-arm.

When the stool $t$ is to be used the false bottom and seat-cushion can be lifted up by turning down the chair-arm $p$, without the necessity of lifting a person incapable of self-movement entirely out of and away from the chair. In such case the arrangement is of great convenience. After the seat is raised the patient is aided to stand in front of the chair while the side, or arm, is turned down and the false bottom raised; and the person need only rise a little from the stool in order to have the false bottom returned to its place.

u is a foot-rest, composed of the three parts v w x. x is a hinged extension, when it is desired to have the foot-rest of considerable length. w is the main frame of the foot-rest, pivoted to the frame b at y. To the main frame w, and on it, is attached a frame, v, by means of two arms, z. This frame is kept pressed down onto w by a proper spring, illustrated at a'. The two sides of the frame v are arranged to work against the two front supports of the arms of the seat of the chair. Thus, when the main frame w is raised, these two sides, pressing against the supports of the arms, will bring the rear part of the foot-rest to a level with the front edge of the seat, and when the foot-rest is dropped down the spring a' will draw this part down between the sides of the main frame w. The spring may be made and applied in any convenient manner. The whole foot-rest is supported, when raised, by the toothed arms b' catching on lips c', and pivoted to the main frame w.

The chair may be used for a bed, with its back dropped nearly to a level, the seat elevated, and the foot-rest raised and extended.

d' shows a lever for operating the shaft n.

When the chair is to be moved or transported, it is so constructed that it may be taken into five parts. The back may be removed from the frame or body; the head-rest removed from the back. The seat-frame may be lifted up out of the main frame b, it (the seat-frame) working in grooves in the corners of the main frame b for that purpose. The foot rest can be unhung from the frame b, the studs e' on the frame, and the curved slots f' on the frame w, being provided for that object. g' show supports for the extension x of the foot rest. h' shows a folding drop-shelf, to hold a vessel when the stool is being used. The part i drops down vertically, turning on pivots passing through the pieces j'. When thus dropped down the shelf k' is turned down to a horizontal position to receive the vessel. The shelf k' is pivoted to the lower part of the sides of the part i', and is so arranged as not to drop below a horizontal position. When not in use the shelf k' is folded up into the part i', and they are both then turned up against the lower side of the seat of the stool.

When both the arms are hinged by the lower ends of their supports to the seat, one arm is hinged to the permanent or stool seat, the other to the false bottom, as shown and described.

As another method of operating the foot-rest I describe the following: b is the frame of the body or bottom of the chair, and w is the main frame of the foot-rest. v is the interior frame, but is used without a spring. Substituted for that is the cross-bar h'', from which rise the two short standards i''. The cross-bar is fastened to the arms b'. The interior frame v is hinged to w at k''. As the main frame of the foot-rest is elevated the interior frame is pushed up by the standards i'', so as to be on a level with the seat of the chair, as in the other form.

What I claim as my invention, and desire to secure by Letters Patent, is—

1. The combination of the back a with the body b by means of the hinges c, one of them having the pivot a, so that the back can be removed from the body, as herein described.

2. The head-rest j, constructed as described, and applied to the back a, as set forth.

3. The combination of the seat m, shaft n, and cams o, as and for the purposes herein described.

4. The arms p, slotted braces q, and thumb-screws s, in combination with the false bottom r and the hinges of the arms, as herein described.

5. The foot-rest u, having the parts v w x, the spring a', the arms b', all to operate as herein described.

6. The folding drop-shelf h', composed of the parts i'' and k', operating as herein described.

In testimony that I claim the foregoing as my own I affix my signature in presence of two witnesses.

NOAH P. BURGESS.

Witnesses:
WM. HENRY CLIFFORD,
FRANK H. JORDAN.